United States Patent
Nukui et al.

(10) Patent No.: US 9,358,681 B2
(45) Date of Patent: Jun. 7, 2016

(54) WORK HANGING APPARATUS AND WORK HANGING METHOD FOR HANGING WORK ON HANGER THROUGH MOVEMENT OF WORK UNDER CORRECTION

(71) Applicant: NHK SPRING CO., LTD., Yokohama-shi, Kanagawa (JP)

(72) Inventors: Kotaro Nukui, Yokohama (JP); Takashi Yajima, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 13/788,690

(22) Filed: Mar. 7, 2013

(65) Prior Publication Data

US 2013/0245814 A1  Sep. 19, 2013

(30) Foreign Application Priority Data

Mar. 16, 2012  (JP) ................................. 2012-059751

(51) Int. Cl.
*G06F 7/00* (2006.01)
*B25J 9/00* (2006.01)
*B25J 9/16* (2006.01)

(52) U.S. Cl.
CPC .............. *B25J 9/0093* (2013.01); *B25J 9/1697* (2013.01); *G05B 2219/39102* (2013.01); *G05B 2219/39107* (2013.01); *G05B 2219/39394* (2013.01); *G05B 2219/40607* (2013.01); *Y10S 901/07* (2013.01); *Y10S 901/09* (2013.01); *Y10S 901/31* (2013.01)

USPC ............... 700/228; 700/259; 452/149; 901/7; 901/9; 901/31

(58) Field of Classification Search
USPC ......................................................... 700/228
See application file for complete search history.

(56) References Cited

U.S. PATENT DOCUMENTS

| 2003/0018414 A1* | 1/2003 | Watanabe et al. ............. 700/259 |
| 2007/0131523 A1 | 6/2007 | Nothum |
| 2007/0212995 A1* | 9/2007 | Mammoto et al. ............ 452/149 |
| 2011/0022217 A1* | 1/2011 | Asamizu ....................... 700/114 |
| 2011/0098859 A1* | 4/2011 | Irie et al. ....................... 700/259 |

FOREIGN PATENT DOCUMENTS

| CN | 1974350 | 6/2007 |
| JP | 5-70682 | 9/1993 |
| JP | 6-56248 | 3/1994 |
| JP | 2009-241227 | 10/2009 |
| JP | 2011-161616 | * 8/2011 ............... B25J 13/03 |

* cited by examiner

*Primary Examiner* — Kyle Logan
(74) *Attorney, Agent, or Firm* — Jordan and Hamburg LLP

(57) ABSTRACT

A work hanging apparatus includes a hanger line continuously conveying hangers each having a hook, a robot that has a hand with which a work having a hole is held and transfers the held work to a hanging location set in the hanger line, a controller controlling a movement of the hand to catch the hook of one of the hangers with the hole of the held work at the hanging location, a hole deviation detector that detects a positional deviation of the hole of the work, an attitude deviation detector that detects an attitudinal deviation of the hanger, and a corrector that corrects the movement of the hand according to the positional and attitudinal deviations.

13 Claims, 11 Drawing Sheets

WORK HANGING APPARATUS AND WORK HANGING METHOD FOR HANGING WORK ON HANGER THROUGH MOVEMENT OF WORK UNDER CORRECTION

BACKGROUND OF THE INVENTION

1. Field of the Invention

The present invention relates to a work hanging apparatus and a work hanging method for hanging a work such as car stabilizer on a hanger of a hanger line through a movement of the work under a correction.

2. Description of Related Art

Japanese Unexamined Patent Application Publication No. 2011-161616 discloses a work feeding apparatus and a work feeding method that feed works to a hanger line. This related art employs a robot having a hand for holding and three-dimensionally moving a work, a robot controller for controlling the robot, an image taking unit for photographing an image of a hanger conveyed through the hanger line, and a real-time computer for providing the robot controller with a track of the robot's hand.

According to the image of the hanger, the robot controller detects the position and attitude of a hook of the hanger, and according to the detection, feedback-controls the robot so that the robot's hand holding the work may follow the hook of the hanger and hang the work on the hook of the hanger.

The related art conveys a plurality of hangers through the hanger line and safely and surely hangs works on the hooks of the hangers without stopping the hanger line, without regard to the orientation of each hook, and without employing other special facilities. In feeding works to the hanger line, the related art is able to feed works to the hangers independent of manpower and improve the operating speed of the hanger line.

The related art, however, has a limit in correctly hanging a work such as a car stabilizer on the hook of a given hanger of the hanger line because the related art only detects the position and attitude of the hook of the hanger even when the car stabilizer or the like has a small hole with which the hook of the hanger is caught.

In particular, the car stabilizers are generally not required to be precise, and therefore, the small holes of the car stabilizers held even by the robot are erratically positioned. Moreover, when the hanger line is used to paint the car stabilizers, the hangers of the hanger line need a burning process to remove paints adhering to the hangers. This burning process deteriorates and deforms the hangers as aging. Therefore, hanging the car stabilizers on the hangers becomes more difficult due to the deformation of the hangers in addition to the small holes of the car stabilizers that are erratically positioned. This results in deteriorating productivity of the stabilizers.

SUMMARY OF THE INVENTION

An object of the present invention is to provide a work hanging apparatus and a work hanging method, capable of correctly hanging a work on a hanger of the hanger line even if a hole for catching a hook of the hanger is formed on the work that is roughly finished and/or even if the hanger involves possibility to be deformed due to, for example, aging.

In order to accomplish the objects, a first aspect of the present invention provides a work hanging apparatus including a hanger line that continuously conveys a plurality of hangers each having a hook, a robot that has a hand with which a work having a hole is held and transfers the held work to a hanging location set in the hanger line, a controller that controls a movement of the hand to catch the hook of a given one of the hangers as an target hanger with die hole of the work at the hanging location for hanging the work on the target hanger, a hole deviation detector that detects a positional deviation of the hole of the work with respect to a reference hole position before hanging the work on the target hanger, an attitude deviation detector that detects an attitudinal deviation of the target hanger with respect to a reference hanger attitude defining a hook of a reference hanger to be allowed to be caught with a hole of a reference work in the reference hole position at the hanging location before hanging the work on the target hanger, and a corrector that corrects the movement of the hand controlled by the controller according to the detected positional deviation and attitudinal deviation so that the hole of the work correctly catches the hook of the target hanger at the hanging location.

A second aspect of the present invention provides a work hanging method of transferring a work having a hole to a hanging location set in a hanger line that continuously conveys a plurality of hangers each having a hook, and at the hanging location, catching the hook of a given one of the hangers as an target hanger with the hole of the work. The method includes detecting a positional deviation of the hole of the work with respect to a reference hole position before hanging the work on the target hanger, detecting an attitudinal deviation of the target hanger with respect to a reference hanger attitude defining a hook of a reference hanger to be allowed to be caught with a hole of a reference work in the reference hole position before hanging the work on the target hanger at the hanging location, and correcting a movement of the work according to the detected positional deviation and attitudinal deviation so that the hole of the work correctly catches the hook of the target hanger at the hanging location.

According to the first aspect of the present invention, even if the hole on the roughly-formed work involves a positional deviation and/or even if the target hanger involves attitudinal deviation due to, for example, deformation, the movement of the hand controlled by the controller is corrected according to the positional deviation of the hole detected by the hole deviation detector and the attitudinal deviation of the target hanger detected by the attitude deviation detector.

This makes the hand of the robot hold the work, transfer the work to the hanging location, and correctly catches the hook of the target hanger with the hole of the work. The correctly hung work is efficiently subjected to, for example, a coating process in the hanger line, thereby improving productivity.

According to the second aspect of the present invention, even if the hole on the roughly-formed work involves positional deviation and/or even if the target hanger involves attitudinal deviation due to, for example, deformation, the movement of the work is corrected according to the positional deviation of the hole and the attitudinal deviation of the target hanger.

This makes the work to be transferred to the hanging location and correctly catch the hook of the target hanger with the hole. The correctly hung work is efficiently subjected to, for example, a coating process in the hanger line, thereby improving productivity.

DETAILED DESCRIPTION OF EMBODIMENTS

A work hanging apparatus and a work hanging method according to an embodiment of the present invention will be explained. The apparatus and method according to the embodiment are capable of correctly hanging a work on a hanger even when catching a hook of the hanger that may involve deformation with a small hole that is roughly formed on the work.

Figure 1:
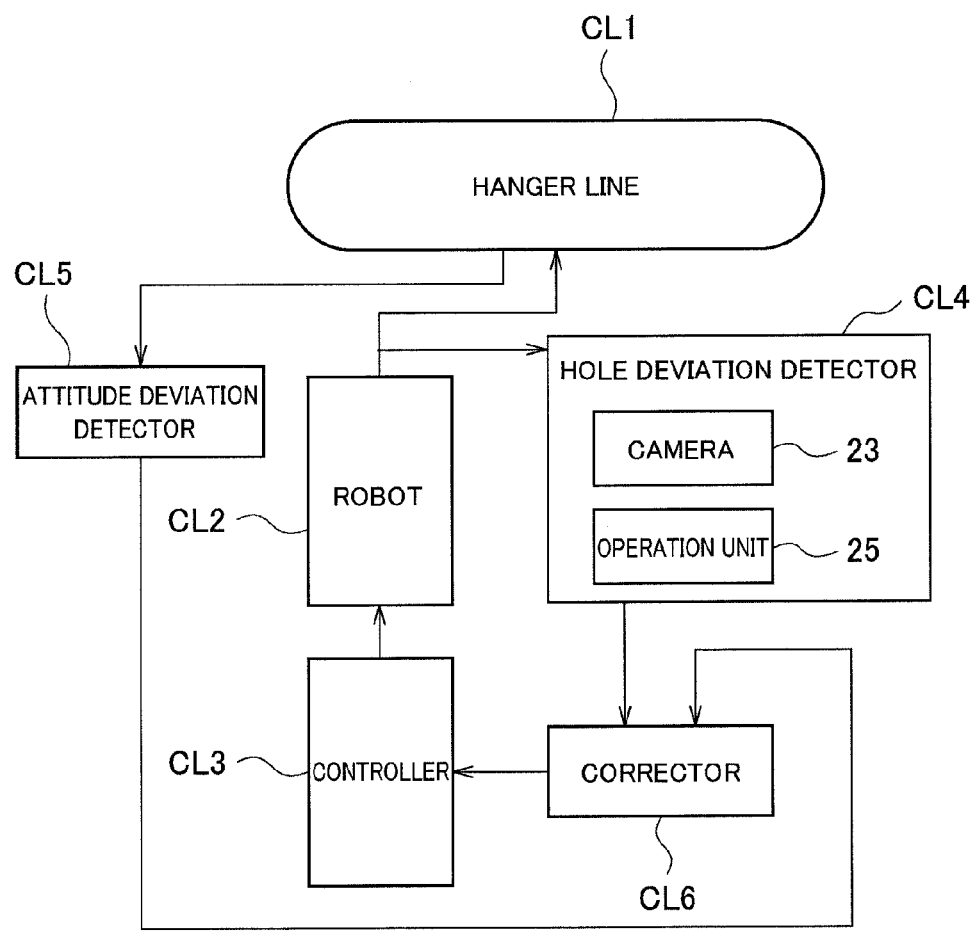
FIG. 1 is a conceptual block diagram illustrating a work hanging apparatus according to an embodiment of the present invention.
Figure 2:
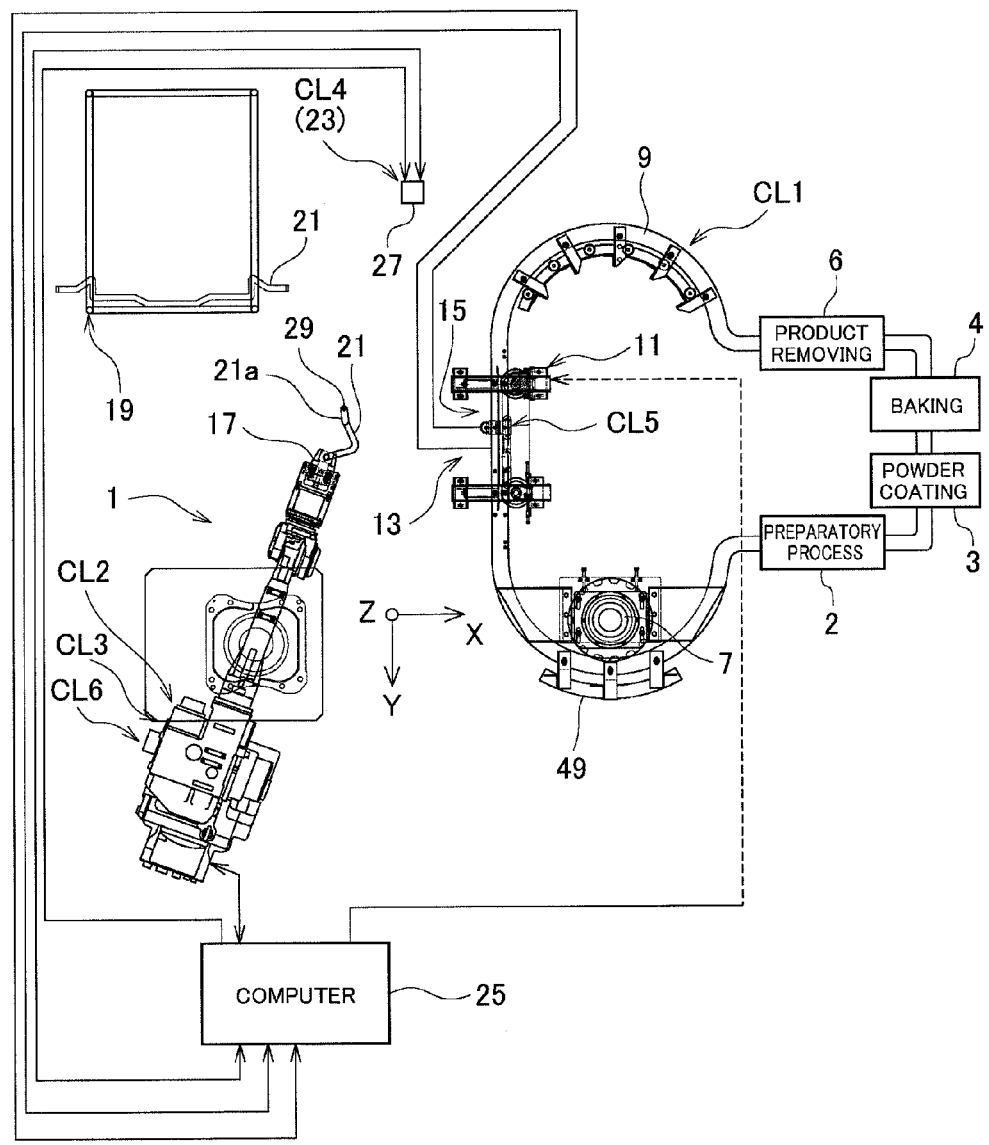
FIG. 2 is a plan view illustrating the work hanging apparatus.
Figure 3:
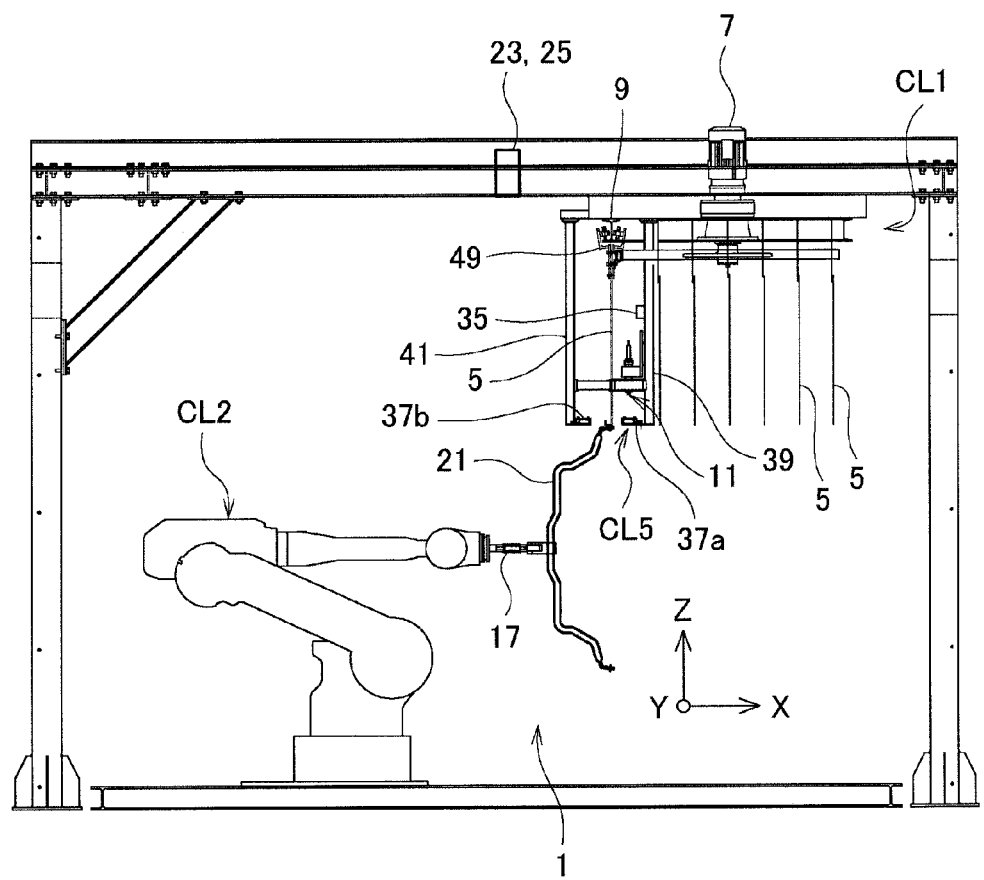
FIG. 3 is a side view illustrating the work hanging apparatus.

First, the work hanging apparatus will be explained in detail with reference to FIGS. 1-3. FIG. 1 is a conceptual block diagram illustrating the work hanging apparatus and FIGS. 2 and 3 are plan and side views illustrating the work hanging apparatus.

What is important for the work hanging apparatus 1 according to the present invention is to include a hanger line CL1 that continuously conveys a plurality of hangers 5 each having a hook (hanger hook) 33, a robot CL2 that has a hand 17 with which one of works i.e., stabilizers 21 each having a hole 29 is held and transfers the held stabilizer 21 to a hanging location 13 set in the hanger line CL1, a controller CL3 that controls a movement of the hand 17 to catch the hook 33 of a given one of the hangers 5 as a target hanger 5 with the hole 29 of the stabilizer 21 at the hanging location 13 for hanging the stabilizer 21 on the target hanger 5, a hole deviation detector CL4 that detects a positional deviation of the hole 29 of the stabilizer 21 with respect to a reference hole position before hanging the stabilizer 21 on the target hanger 5, an attitude deviation detector CL5 that detects an attitudinal deviation of the target hanger 5 with respect to a reference hanger attitude defining a hook of a reference hanger to be allowed to be caught with a hole of a reference stabilizer in the reference hole position at the hanging location 13 before hanging the stabilizer 21 on the target hanger 5, and a corrector CL6 that corrects the movement of the hanger 17 controlled by the controller CL3 according to the detected positional deviation and attitudinal deviation so that the hole 29 of the stabilizer 21 correctly catches the hook 33 of the target hanger 5 at the hanging location 13.

It is preferable for the work hanging apparatus 1 that the hole deviation detector CL4 includes an image taking unit 23 such as camera that takes an image of the hole 29 of the stabilizer 21 at a hole measuring location 27 to output image data, and an operation unit 25 such as computer that calculates the positional deviation of the hole 29 of the stabilizer 21 with respect to a reference hole position (master hole position Mh) at the hole measuring location 27 corresponding to the reference hole position at the hanging location 13 according to the image data.

More preferably, each hanger 5 is suspended from the hanger line CL1, the attitude deviation detector CL5 includes a detecting location sensor 35 arranged in an intermediate area corresponding to an intermediate part of the hanger 5 in a suspending direction thereof, and a deviation sensor 37 arranged in a lower area corresponding to a lower part of the hanger 5 in the suspending direction. In this case, when the detecting location sensor 35 senses the hanger 5, the deviation sensor 37 detects an attitudinal deviation of the lower part of the sensed hanger 5 (target hanger 5) with respect to a master position Mp defining the hook of the reference hanger at a lower part thereof that having no deviation as the attitudinal deviation of the sensed hanger 5.

Hereinafter, the work hanging apparatus 1 according to the preferred embodiment of the present invention will be explained further.

In FIGS. 2 and 3, the work hanging apparatus 1 includes, as mentioned above, the hanger line CL1, robot CL2, hole deviation detector CL4, and attitude deviation detector CL5. The robot CL2 includes the controller CL3 and corrector CL6 as its function.

The hanger line CL1 conveys works each having a hole that is formed not so precisely. According to the embodiment, the hanger line CL1 conveys car stabilizers 21 as the works to a painting process or the like. For the painting process, the hanger line CL1 subjects the car stabilizers 21 to, for example, a preparatory process 2, a powder coating process 3, a baking process 4, and a product removing process 6. In order to convey the stabilizers 21, the hanger line CL1 suspends a plurality of hangers 5 therefrom at predetermined intervals and continuously conveys the hangers 5 along a rail 9 with the use of a driving motor 7. The hangers 5 each have a hook 33 on which a car stabilizer 21 is hung to be conveyed for the painting process.

The stabilizers 21 hung on the hangers 5 are cleaned by the preparatory process 2. The cleaned stabilizers 21 are coated with powder by the powder coating process 3. The coated stabilizers 21 are baked by the baking process 4 to cure the powder coatings thereon. The finished stabilizers 21 with the cured powder coatings are taken out of the hanger line CL1 by the product removing process 6.

The hanger line CL1 has the attitude deviation detector CL5 and a guide unit 11.

The attitude deviation detector CL5 detects an attitudinal deviation of a given hanger 5 (target hanger 5) with respect to the reference hanger attitude. The reference hanger attitude defines a reference hanger to be allowed to hang a reference stabilizer having a hole in the reference hole position at the hanging location 13 in the hanger line CL1 as mentioned above. The attitudinal deviation of the target hanger 5 includes a deviation due to a shape of the hanger 5 and/or a deviation due to a displacement or swinging of the hanger 5 itself. The attitude deviation detector CL5 outputs a detection result to the computer 25 as the operation unit. According to the embodiment, the attitude deviation detector CL5 detects the attitude of the target hanger 5 at an attitude detecting location 15 set in the hanger line CL1 in front of the hanging location 13.

The guide unit 11 maintains the attitude of the target hanger 5 from the attitude detecting location 15 up to the hanging location 13 without change and guides the target hanger 5 between them. The guide unit 11 may be omitted if the attitude of the target hanger 5 is unchanged between the attitude detecting location 15 and the hanging location 13.

The robot CL2 has the hand 17 to pick up the stabilizer 21 from a carrier 19, hold the same, and transfer the stabilizer 21 to the hanging location 13 in the hanger line CL1.

The robot CL2 has the controller CL3 that controls the movement of the hand 7 to transfer the stabilizer 21 picked up from the carrier 19 to the hanging location 13, and at the hanging location 13, catch the hook 33 of the target hanger 5 with the hole 29 of the stabilizer 21 for hanging the stabilizer 21 on the target hanger 5. According to the embodiment, the hand 17 preliminarily transfers the stabilizer 21 to an intermediate location that is set in front of the hanging location 13 under the control of the controller CL3 while the corrector CL6 corrects a movement of the stabilizer 21 according to the positional deviation of the hole 29 of the stabilizer 21.

This enables the movement of the hand 17 or the stabilizer 21 to be corrected in two steps. Namely, the hand 17 of the robot CL2 is controlled to transfer the stabilizer 21 up to the intermediate location in front of the hanging location 13 under the correction of the movement of the hand 17 by the corrector CL6 according to the positional deviation of the hole 29 of the stabilizer 21. Thereafter, the hand 17 of the robot CL2 is controlled to transfer the stabilizer 21 from the intermediate location up to the hanging location 13 under the correction of the corrector CL6 according to the attitudinal deviation of the hanger 5.

The hole deviation detector CL4 detects the positional deviation of the hole 29 of the stabilizer 21 with respect to the reference hole position. The reference hole position defines a hole of a reference stabilizer to be allowed to catch a hook of a reference hanger in the reference hanger attitude at the hanging location 13. According to the embodiment, the hole deviation detector CL4 outputs a detected result as coordinate values on a robot coordinate system. The hole deviation detector CL4 includes the camera 23 as the image taking unit and the computer 25 as the operation unit connected to the camera 23 through a power line.

The camera 23 photographs the hole 29 of the stabilizer 21 at the hole measuring location 27 that is set in a path along which the stabilizer 21 is transferred with the hand 17 of the robot CL2. The camera 23 outputs image data corresponding to the photographed image of the hole 29 to the computer 25. According to the image data, the computer 25 computes a positional deviation of the hole 29 as coordinate values on the robot coordinate system to output the computed positional deviation as the measurement result.

The robot CL2 has the corrector CL6. According to the positional deviation of the hole 29 of the stabilizer 21 and the attitudinal deviation of the target hanger 5, the corrector CL6 corrects the movement of the hand 17 (movement of the stabilizer 21) controlled by the controller CL3.

Figure 4:
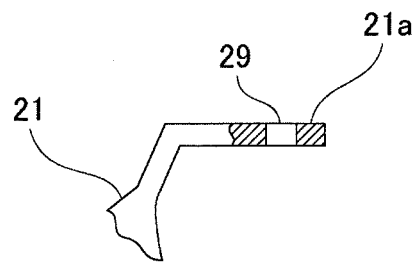
FIG. 4 is a partial sectional view illustrating a hole of a stabilizer that is fed as a work to a hanger line of the work hanging apparatus.

The positional deviation of the hole 29 of the stabilizer 21 will be explained in detail with also reference to FIGS. 4-5. FIG. 4 is a partial sectional view illustrating the hole 29 of the stabilizer 21 and FIG. 5 is a plan view illustrating an example of the positional deviation of the hole 29.

As illustrated in FIG. 4, the hole 29 of each stabilizer 21 is formed at each end 21a of the stabilizer 21 and is vertically oriented when the stabilizer 21 is held by the hand 17 of the robot CL2. The orientation of the hole 29 at each end 21a of the stabilizer 21 and a hanging attitude (horizontal angular position) thereof vary depending with the type of a work. The stabilizer 21 is to be installed in a car with the holes 29 that are fastened with respective male threads of left and right suspension members.

Figure 5:
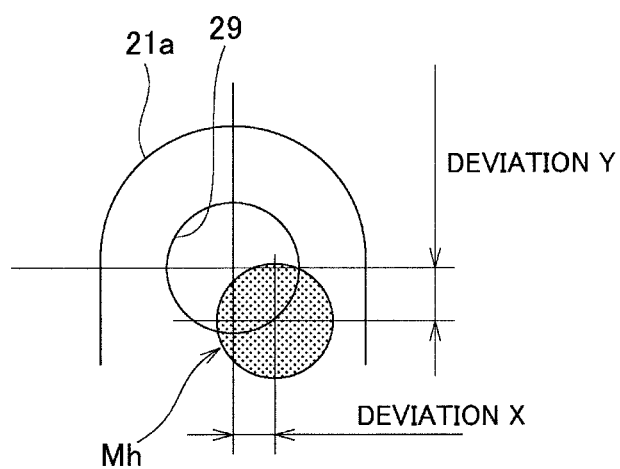
FIG. 5 is a plan view illustrating a positional deviation of the hole of the stabilizer.

In FIG. 5, the positional deviation of the hole 29 of the stabilizer 21 is detected by computing coordinate values (X, Y) of the positional deviation on the robot coordinate system base on the photographed hole 29 with respect to a master hole position Mh. The master hole position Mh is a reference hole position set at the hole measuring location 27 and corresponds to the reference hole position defining a hole of a reference stabilizer to be allowed to catch a hook of a reference hanger in the reference hanger attitude at the hanging location 13. The coordinate value Y is in the conveying direction of the hanger 5 at the hanging location 13 in the hanger line CL1.

Figure 6:
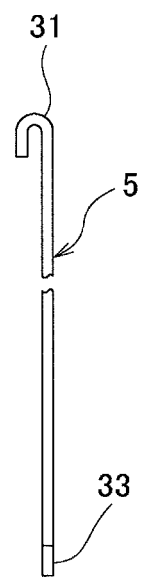
FIGS. 6 and 7 are front and side views illustrating a hanger suspended from and conveyed by the hanger line.
Figure 7:
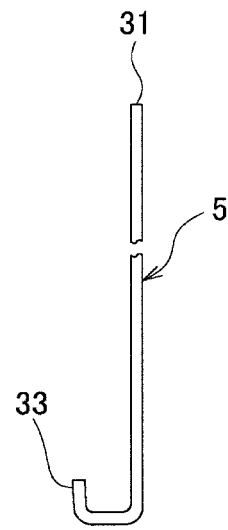

One of the hangers 5 that have the same configuration will be explained in detail. FIG. 6 is a front view illustrating the hanger 5 and FIG. 7 is a side view illustrating the same. The hanger 5 has an upper hook (suspension hook) 31 and the lower hook (hanger hook) 33 that has a tip end oriented upward. With the upper hook 31, the hanger 5 is suspended from the hanger line CL1. Unless otherwise noted, the "hook" means the "lower hook" as the hanger hook.

Figure 8:
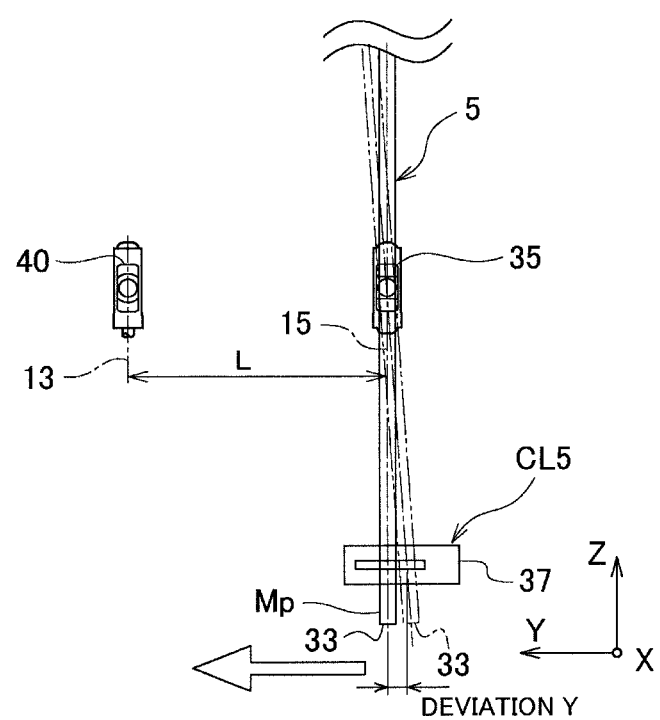
FIG. 8 is a front view illustrating an attitude deviation detector of the work hanging apparatus.

The attitude deviation detector CL5 will be explained with reference to FIG. 8 as well as FIGS. 2 and 3. FIG. 8 is a front view illustrating the attitude deviation detector CL5. The attitude deviation detector CL5 detects an attitude of a given hanger 5 (target hanger 5) at the attitude detecting location 15 that is set in front of the hanging location 13 as mentioned above. In FIG. 8, the attitude deviation due to a displacement of the hanger 5 itself is exemplarily represented with a dotted line. However, in some cases, the attitude deviation illustrated in FIG. 8 is assumed to be the attitude deviation due to the shape of the hanger 5 for the following explanation.

The locations 13 and 15 are separated away from each other by a distance L.

The attitude deviation detector CL5 includes the detecting location sensor 35 and the deviation sensor 37. The detecting location sensor 35 is arranged in the intermediate area to sense an intermediate part of the hanger 5 in a suspending direction thereof and is attached to a hanger flame 39. The deviation sensor 37 is arranged in the lower area to detect a lower part of the hanger 5 in the suspending direction thereof. The deviation sensor 37 is a transmission laser displacement sensor including an emitter 37a and a receiver 37b that are attached to the hanger frames 39 and 41, respectively.

When the detecting location sensor 35 detects a target hanger 5, in the case of FIG. 8, the deviation sensor 37 detects a distance between the reference position of a reference hanger (depicted as a continuous line) without deformation or displacement and an actual (deviated) position of the target hanger 5 (depicted as a dotted line). If the target hanger 5 has the attitudinal deviation like FIG. 8, the detecting location sensor 35 outputs the distance as a coordinate value Y on the robot coordinate system.

This coordinate value Y corresponds to a coordinate value Y of an attitudinal deviation of the hook 33 of the target hanger 5 with respect to a master hook position Mp defining a hook of a reference hanger that involves no deviation.

At the hanging location 13, a hanging location sensor 40 is arranged on the hanger frame 39.

Figure 9:
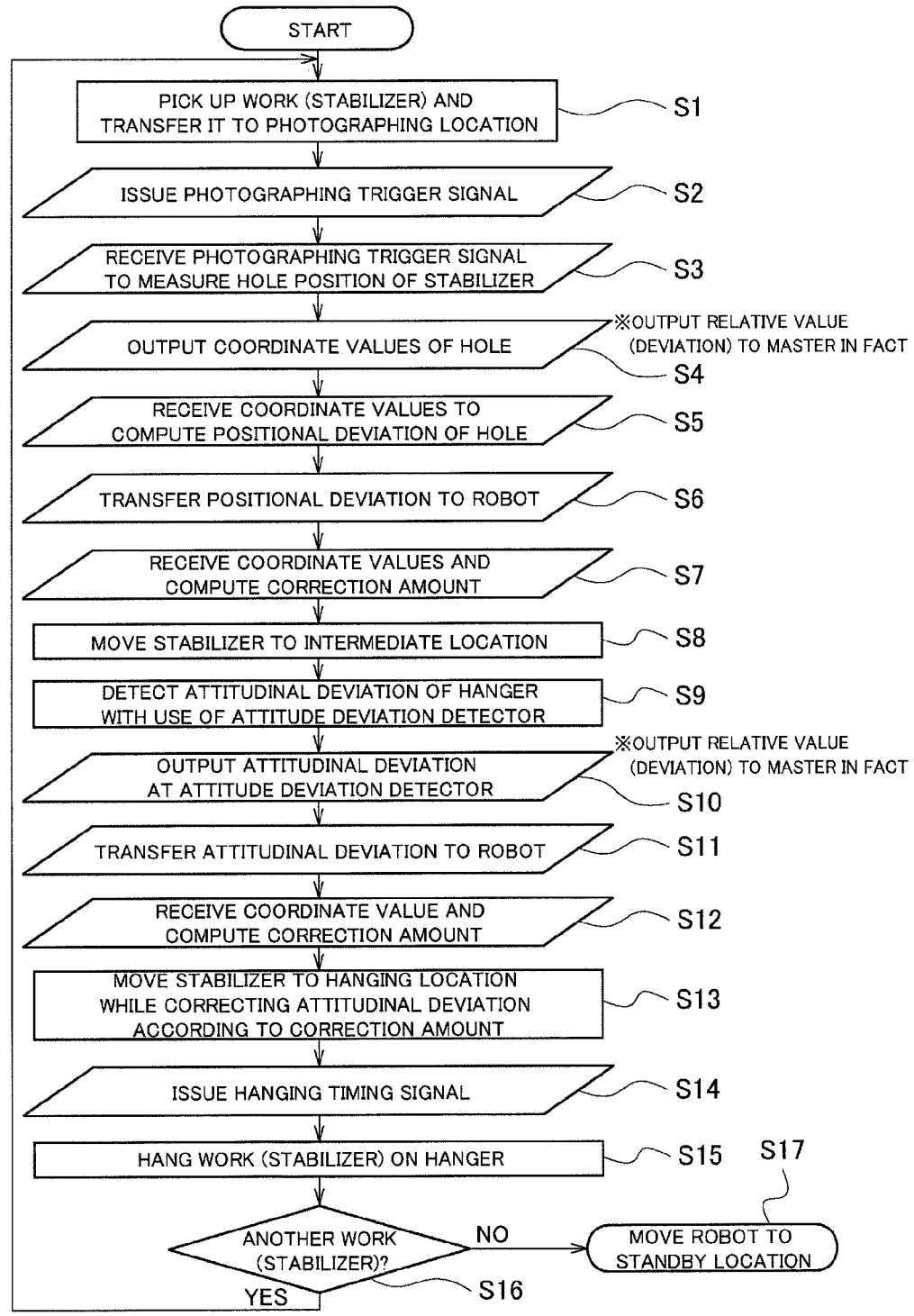
FIG. 9 is a flowchart illustrating a work hanging control based on a work hanging method according to an embodiment of the present invention.

Before further explaining the work hanging apparatus 1, a work hanging control based on the work hanging method according to an embodiment of the present invention will be explained with reference to the flowchart of FIG. 9.

The flowchart starts when the presence of a stabilizer 21 on the carrier 19 is sensed.

Step S1 carries out a process of "Picking up the stabilizer and transfer it to a photographing location." Namely, the hand 17 of the robot CL2 controlled by the computer 25 holds a middle part of the sensed stabilizer 21 on the carrier 19 to pick up the same from the carrier 19 and transfers the held stabilizer 21 to the hole measuring location 27 as the photographing location. Then, it proceeds to Step S2.

Step S2 carries out a process of "Issuing a photographing trigger signal." Namely, when the computer 25 receives a control signal from the robot CL2 and the held stabilizer 21 is moved to the hole measuring location 27, the computer 25 issues the photographing trigger signal to the camera 23. Then, it proceeds to Step S3.

Step S3 carries out a process of "Receiving the photographing trigger signal to measure a hole position of the stabilizer." Namely, the camera 23 receives the photographing trigger signal and releases the shutter to photograph (measures) the hole 29 of the stabilizer 21 to obtain image data similar to the image as illustrated in FIG. 5. Then, it proceeds to Step S4.

Step S4 carries out a process of "Outputting coordinate values of the hole." Namely, the camera 23 outputs the image data as coordinate values of the hole 29 of the stabilizer 21 to the computer 25. Then, it proceeds to Step S5.

Step S5 carries out a process of "Receiving coordinate values to compute a positional deviation of the hole." Namely, the computer 25 computes a positional deviation of the photographed hole 29 of the stabilizer 21 based on the image data with respect to the master hole position Mh at the hole measuring location 27 and provides the positional deviation as coordinate values (X, Y) on the robot coordinate system. Then, it proceeds to Step S6.

Step S6 carries out a process of "Transferring the positional deviation to the robot." Namely, the coordinate values (X, Y) of the positional deviation of the hole 29 is transferred to the robot CL2. Then, it proceeds to Step S7.

Step S7 carries out a process of "Receiving the coordinate values and compute correction amount." Namely, the corrector CL6 of the robot CL2 receives the coordinate values (X, Y) of the positional deviation to compute correction amount. Then, it proceeds to Step S8.

Step S8 carries out a process of "Moving the stabilizer to the intermediate location." Namely, the controller CIA controls the hand 17 holding the stabilizer 21 to move the stabilizer 21 to the intermediate location in front of the hanging location 13 wider the correction of the corrector CL6 based on the correction amount for the positional deviation. The positional deviation of the hole 29, therefore, is corrected when the stabilizer 21 is positioned at the intermediate location. Then, it proceeds to Step S9.

Step S9 carries out a process of "Detecting an attitudinal deviation of a hanger with use of the attitude deviation detector." Namely, the attitude deviation detector CL5 detects an attitudinal deviation of a target hanger 5 at the attitude detecting location 15 as illustrated in FIG. 8. Then, it proceeds to Step S10.

Step S10 carries out a process of "Outputting the attitudinal deviation at the attitude deviation detector." Namely, the attitudinal deviation of the target hanger 5 is output to the computer 25, to proceed to Step S11.

Step S11 carries out a process of "Transferring the attitudinal deviation to the robot." Namely, the computer 25 computes a coordinate value Y on the robot coordinate axis corresponding to the attitudinal deviation and transfers the coordinate value Y of the attitudinal deviation to the corrector CL6 of the robot CL2. Then, it proceeds to Step S12.

Step S12 carries out a process of "Receiving the coordinate value and compute correction amount." Namely, according to the received coordinate value Y of the attitudinal deviation of the target hanger 5, the corrector CL6 computes correction amount to correct the movement of the stabilizer 21 in the period between the intermediate location and the hanging location 13. This enables the hole 29 of the stabilizer 21 to be correctly brought to a position just above the hook 33 of the target hanger 5. Then, it proceeds to Step S13.

Step S13 carries out a process of "Moving the stabilizer to the hanging location while correcting the attitudinal deviation according to the correction amount." Namely, the controller CL3 controls the hand 17 holding the stabilizer 21 to move the stabilizer 21 from the intermediate location to the hanging location 13 under the correction of the corrector CL6 based on the correction amount for the attitudinal deviation. With the corrected movement, the hole 29 of the stabilizer 21 is correctly positioned above the hook 33 of the target hanger 5 at the target hanging location 13 even if the target hanger 5 is attitudinally deviated due to, for example, deformation. In this way, the attitudinal deviation of the target hanger 5 is corrected when the stabilizer 21 is positioned at the hanging location 13. Then, it proceeds to Step S14.

Step S14 carries out a process of "Issuing a hanging timing signal." Namely, the hanging location sensor 40 at the hanging location 13 detects the target hanger 5 and outputs a detection signal to the robot CL2 through the computer 25 as the hanging timing signal. Then, it proceeds to Step S15.

Step S15 carries out a process of "Hanging the stabilizer on the hanger." Namely, according to the hanging timing signal, the controller CL3 controls the hand 17 of the robot CL2 to catch the hook 33 of the target hanger 5 with the hole 29 of the stabilizer 21, thereby hanging the stabilizer 21 on the hook 33 of the target hanger 5. Then, it proceeds to Step S16.

Step S16 carries out a process of "determining whether there is another work (stabilizer) or not." Namely, the work hanging apparatus 1 checks to see if there is another stabilizer, i.e., work on the carrier 19. If there is, steps S1 to S15 are repeated, and if not, step S17 is carried out. Step S16 may be carried out by storing the initial number of stabilizers 21 placed on the carrier 19 and by counting the total number of stabilizers 21 picked up by the robot CL2. Instead, step S16 may be carried out by storing the initial total weight of the carrier 19 and by measuring the weight of the carrier 19 whenever the robot CL2 picks up the stabilizer 21.

Step S17 carries out a process of "Moving the robot to a standby location." Namely, the robot CL2 moves to a predetermined standby location under the control of the controller CL3. This completes every process of the work hanging control based on the work hanging method according to the embodiment.

Figure 10:
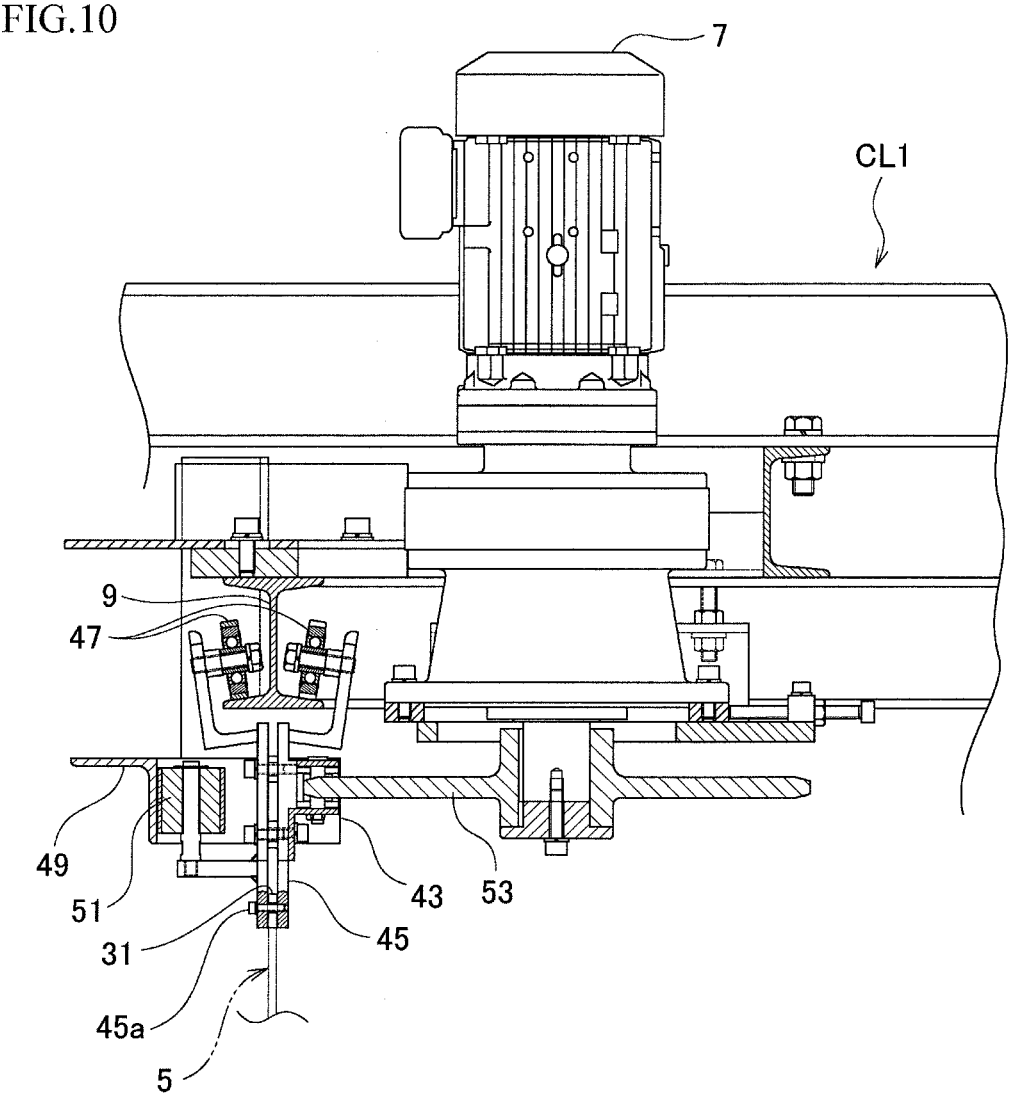
FIG. 10 is an enlarged sectional view illustrating a mechanism for driving hangers in the hanger line.
Figure 11:
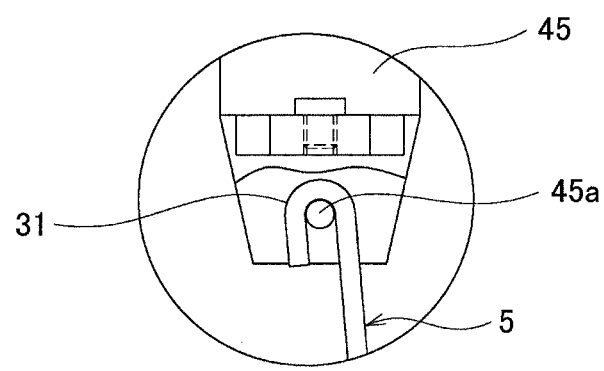
FIG. 11 is an enlarged view illustrating a mechanism for suspending the hunger from the hanger line.

Returning the work hanging apparatus 1, a mechanism tier driving the hangers 5 through the hanger line CL1 will be explained with reference to FIGS. 10 and 11 in which FIG. 10 is an enlarged sectional view illustrating the mechanism and FIG. 11 is an enlarged view illustrating a mechanism for suspending the hanger 5 from the hanger line CL1.

In FIGS. 10 and 11, each hanger 5 is suspended from a suspender 45 connected to a chain 43 that runs along the hanger line CL1. The suspender 45 has a pin 45a with which the upper hook (suspension hook) 31 of the hanger 5 engages for suspending the hanger 5 from the suspender 45.

The suspender 45 travels with a roller 47 along the rail 9. The suspender 45 is provided with a guide roller 51 that rolls along a guide rail 49 to guide the suspender 45 along the guide rail 49.

The chain 43 is wrapped around a sprocket 53 that is driven by the motor 7. The motor 7 drives the sprocket 53 to move the chain 43 along the rail 9.

With the chain 43, the hangers 5 are continuously conveyed through the hanger line CL1, and at the hanging location 13, the stabilizer 21 is hung on a given one of the hangers 5 and is successively conveyed through the preparatory process 2, powder coating process 3, baking process 4, and product removing process 6.

Figure 12:
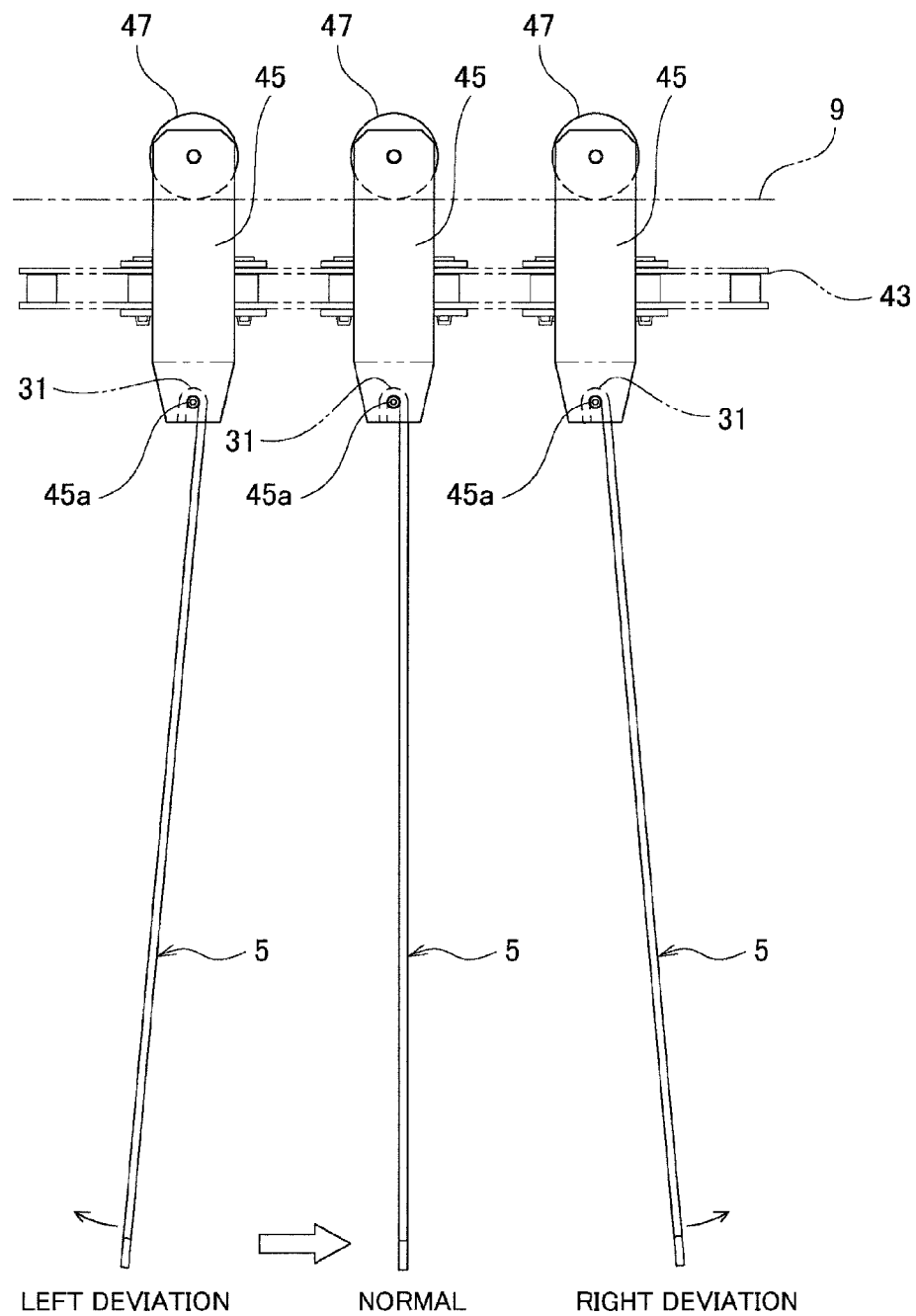
FIG. 12 is a front view illustrating examples of attitudes of hangers in the hanger line.

FIG. 12 is a front view illustrating examples of attitudinal deviations of the hangers 5 suspended from the hanger line CL1.

Each hanger 5 is suspended from the hanger line CL1 with the upper hook 31 of the hanger 5 being hooked on the pin 45a of the suspender 45 as illustrated in FIG. 11. Due to this, the hanger 5 sometimes swings or is displaced backward and frontward in a conveying direction of the hanger 5 as illustrated in FIG. 12 with arrows. Such displacement spontaneously and uncertainly occurs.

If the displacement of the hanger 5 occurs between the attitude detecting location 15 and the hanging location 13, the stabilizer 21 will not correctly be hung on the hanger 5 at the hanging location 13 even if an attitudinal deviation of the hanger 5 (FIG. 8) is detected at the attitude detecting location 15 and is corrected accordingly. In FIG. 12, the central hanger 5 is normal in attitude and is conveyed in an outlined arrow direction. The left and right hangers 5 in FIG. 12 are displaced leftward and rightward in arrow directions, respectively, and are conveyed in the outlined arrow direction.

To maintain the attitude of each hanger 5 from the attitude detecting location 15 up to the hanging location 13 without change, the guide unit 11 is arranged according to the embodiment.

Figure 13:
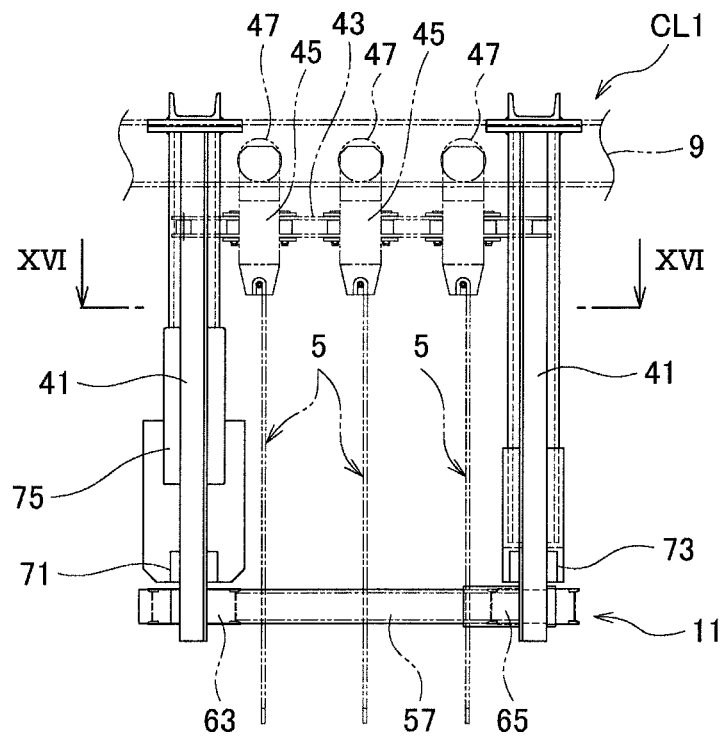
FIGS. 13 and 14 are front and side views illustrating a guide unit installed in the hanger line guiding hangers.
Figure 14:
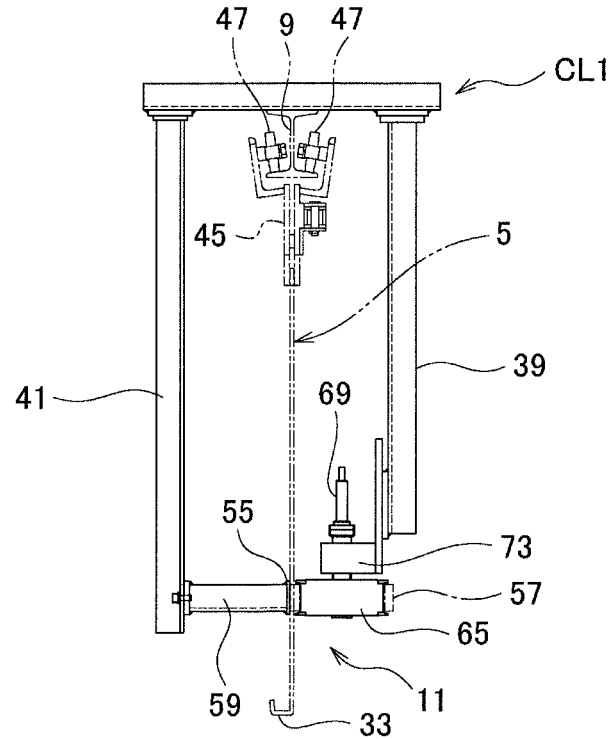
Figure 15:
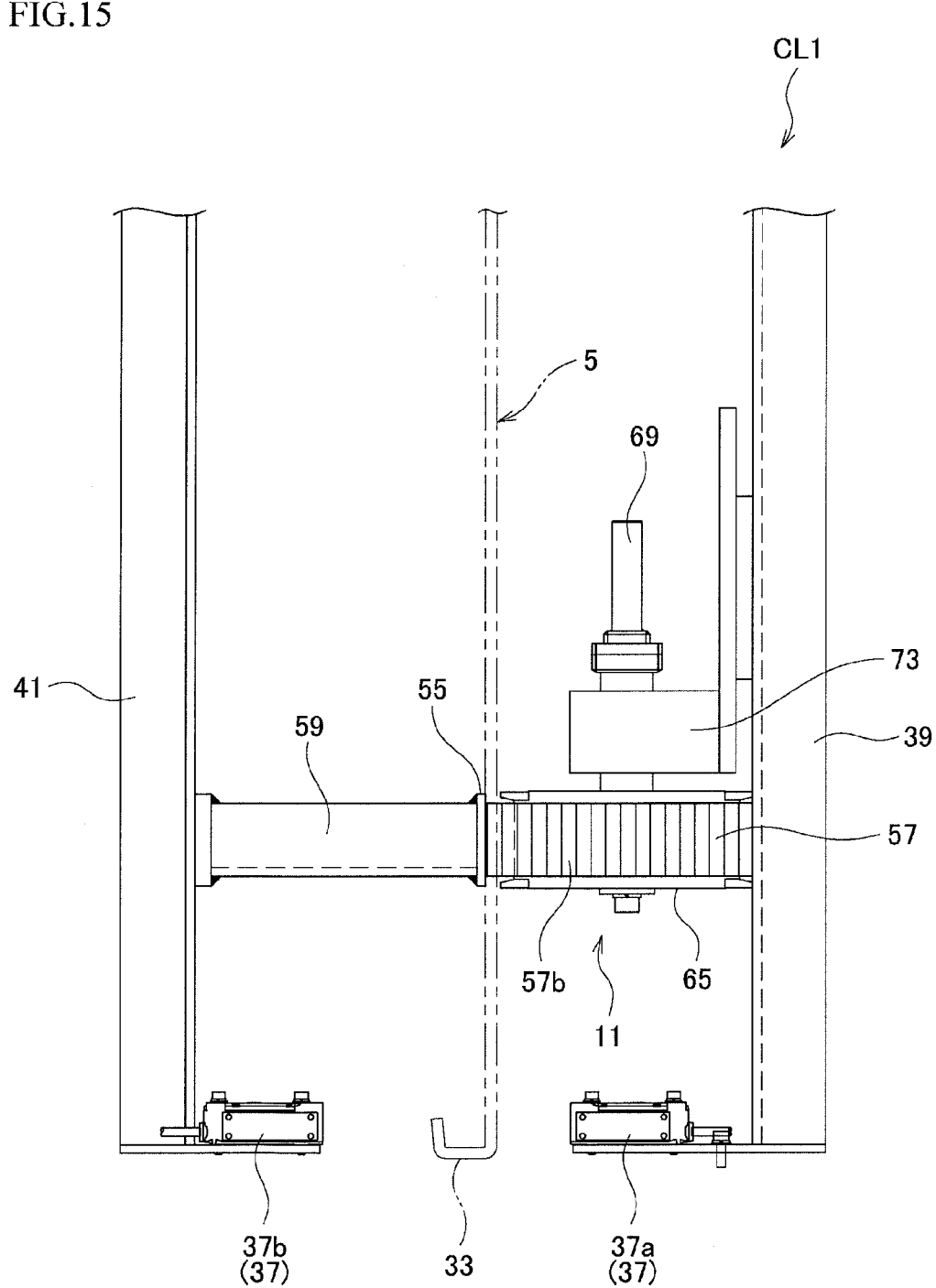
FIG. 15 is an enlarged side view illustrating the guide unit guiding a hanger.
Figure 16:
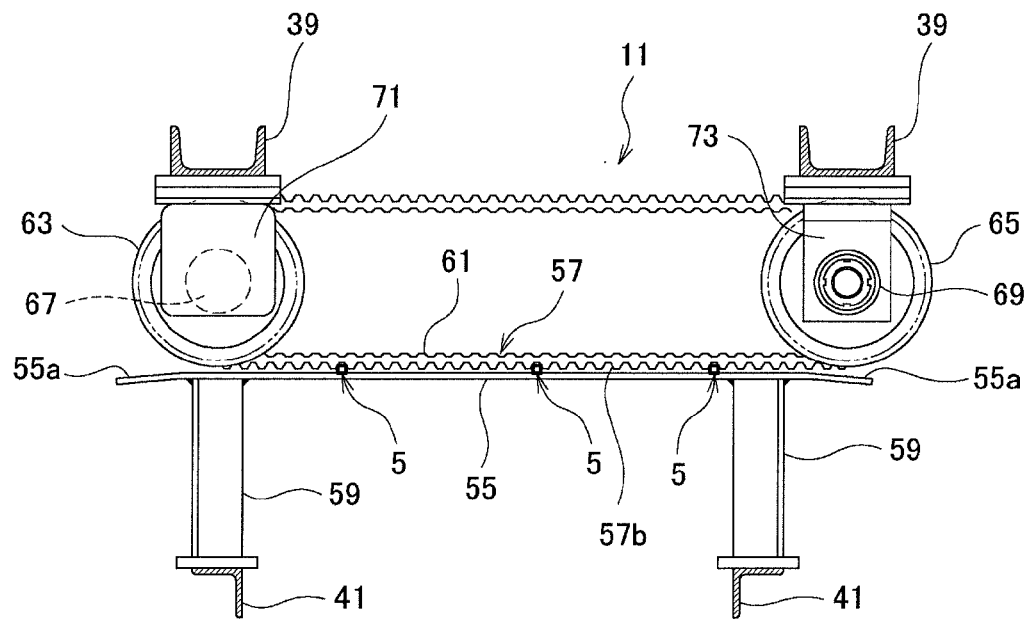
FIG. 16 is a sectional view taken along a line XVI-XVI of FIG. 13.
Figure 17:
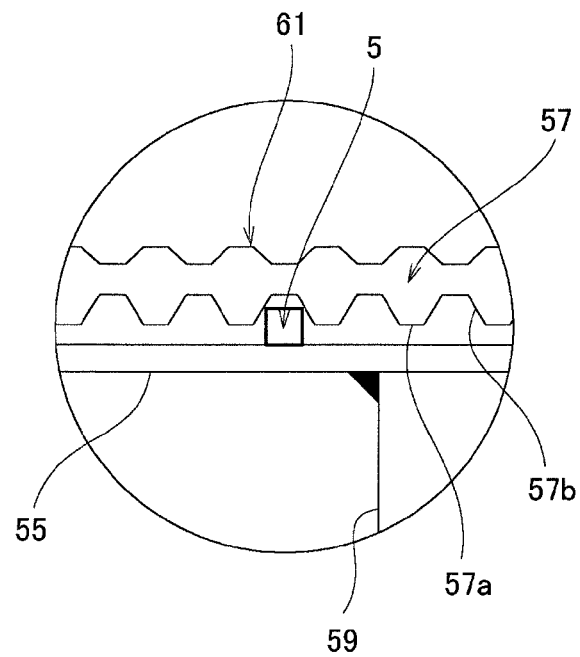
FIG. 17 is an enlarged sectional view illustrating part of FIG. 16.

FIGS. 13 and 14 are front and side views illustrating the guide unit 11 guiding the hangers 5 in the hanger line CL1, FIG. 15 is an enlarged side view illustrating the guide unit 11 guiding the hangers 5, FIG. 16 is a sectional view taken along a line XVI-XVI of FIG. 13, and FIG. 17 is an enlarged sectional view illustrating part of FIG. 16.

The guide unit 11 is to maintain the attitude of the hangers 5 without change from the attitude detecting location 15 up to the hanging location 13 and convey them from the location 15 to the location 13. The guide unit 11 is arranged between the hanger frames 39 and 41 and spans between the attitude detecting location 15 and the hanging location 13. According to the embodiment, the attitude detecting location 15 and hanging location 13 are set in the middle of a guiding range of the guide unit 11 in the conveying direction of the hangers 5 corresponding to a guiding direction. The guide unit 11 holds a vertical intermediate part of a target hanger 5 and guides the same in synchronization with the chain 43 of the hanger line CL1.

The guide unit 11 includes a guide plate 55 and a guide belt 57 that is driven along the guide plate 55.

The guide plate 55 elongates in the guiding direction of the guide unit 11 and is fixed to the hanger frame 41 with guide brackets 59. At the center between the hanger frames 39 and 41, the guide plate 55 faces the guide belt 57. Each end 55a of the guide plate 55 is slightly inclined. The entrance end 55a of the guide plate 55 functions as a drawing guide to receive the target hanger 5. The surface of the guide plate 55 may be coated with Teflon® to smoothly slide the target hanger 5 along the same.

The guide belt 57 is made of, for example, rubber. A face 57a of the guide belt 57 that faces the guide plate 55 has successive recesses 57b. The face 57a of the guide belt 57 that faces the guide plate 55 is slightly spaced away from the guide plate 55 as illustrated in FIG. 17, so that the target hanger 5 is positioned in the recess 57b and is held between the guide plate 55 and the guide belt 57. An inner circumferential face opposite to the face 57a of the guide belt 57 is provided with convexconcave 61 for driving the guide belt 57.

The guide belt 57 is wrapped around a pair of toothed timing pulleys 63 and 65 that are supported with rotary shafts 67 and 69. The rotary shafts 67 and 69 are rotatably supported by bearing blocks 71 and 73 that are fixed to the hanger frame 39.

The rotary shaft 67 of the timing pulley 63 is connected to a guide motor 75 and is driven thereby.

The guide motor 75 is driven according to a driving condition of the motor 7 and is controlled to run the guide belt 57 in synchronization with the chain 43.

A target hanger 5 is carried by the chain 43 toward the attitude detecting location 15, is pulled into the gap between the guide plate 55 and the guide belt 57 being driven, and is received in the recess 57b as illustrated in FIG. 17 so that the target hanger 5 is held between the guide plate 55 and the guide belt 57.

Thereafter, the target hanger 5 is moved between the guide plate 55 and the guide belt 57 with the guide belt 57 driven in synchronization with the chain 43 of the hanger line CL1, and at the attitude detecting location 15, the attitude deviation detector CL5 detects an attitude of the target hanger 5.

After the attitude detection, the target hanger 5 is still continuously moved between the guide plate 55 and the guide belt 57 with the guide belt 57 synchronized with the chain 43 to the hanging location 13 without changing the attitude thereof.

In this way, the guide unit 11 maintains the attitude of the target hanger 5 from the attitude detecting location 15 up to the hanging location 3, to make the hole 29 of the held stabilizer 21 to correctly catch the hook 33 of the target hanger 5 at the hanging location 13 for hanging the stabilizer 21 on the target hanger 5.

After the hanging operation, the target hanger 5 is moved out of the guide unit 11 and is conveyed to the preparatory process 2 and the like.

The guide unit 11 is not limited to a combination of the guide plate 55 and guide belt 57. The guide unit 11 may have an optional configuration as long as it is able to hold the hanger 5 and convey the same in synchronization with the chain 43 of the hanger line CL1. For example, the guide unit 11 may be a combination of a pair of guide belts that are faced to each other and each are supported with a guide plate from behind. In this case, each guide belt may be provided with the recesses 57b, or one of the guide belts may be a flat belt.

Effects of the embodiments of the present invention will be explained.

The work hanging apparatus 1 includes the hanger line CL1 that continuously conveys the hangers 5 each having the hook 33, the robot CL2 that has the hand 17 with which the stabilizer 21 as a work having the hole 29 is held and transfers the held stabilizer 21 to the hanging location 13 set in the hanger line CL1, the controller CL3 that controls a movement of the hand 17 to catch the hook 33 of a given one of the hangers 5 as a target hanger 5 with the hole 29 of the stabilizer 21 at the hanging location 13, the hole deviation detector CL4 that detects a positional deviation (coordinate values X, Y) of the hole 29 of the stabilizer 21 with respect to the reference hole position before hanging the stabilizer 21 on the target hanger 5, the attitude deviation detector CL5 that detects an attitudinal deviation (coordinate value Y) of the target hanger 5 with respect to the reference hanger attitude defining a hook of a reference hanger to be allowed to be caught with a hole of a reference stabilizer in the reference hole position at the hanging location 13 before hanging the stabilizer 21 on the target hanger 5, and the corrector CL6 that corrects the movement of the hand 17 controlled by the controller CL3 according to the detected positional deviation and attitudinal deviation so that the hole 29 of the stabilizer 21 correctly catches the hook 33 of the target hanger 5 at the hanging location 13.

Even if the hole 29 of the stabilizer 21 is formed not so precisely and has a positional deviation and/or the target hanger 5 has an attitudinal deviation due to, for example, deformation, the corrector CL6 corrects the movement of the hand 17 controlled by the controller CL3 according to the coordinate values (X, Y) of the positional deviation of the hole 29 detected by the hole deviation detector CL4 and the coordinate value (Y) of the attitudinal deviation of the target hanger 5 detected by the attitude deviation detector CL5.

Due to this correction, the hand 17 of the robot CL2 holds the stabilizer 21 and correctly moves to catch the hook 33 of the target hanger 5 with the hole 29 of the stabilizer 21 at the hanging location 13, thereby hanging the stabilizer 21 on the target hanger 5. As a result, the stabilizer 21 is efficiently finished through the preparatory process 2 and the like, thereby improving productivity.

At the hole measuring location 27 that is set in a path along which the stabilizer 21 is transferred with the hand 17 of the robot CL2, the hole deviation detector CIA detects the coordinate values (X, Y) of the positional deviation of the hole 29.

Namely, the coordinate values (X, Y) of the positional deviation of the hole 29 are smoothly and correctly detected in advance at the hole measuring location 27 that is separated away from the hanger line CL1.

According to the coordinate values (X, Y) of the positional deviation of the hole 29, the controller CL3 controls the movement of the hand 17 to preliminarily transfer the stabilizer 21 to the intermediate location set in front of the hanging location 13.

This results in accurately correcting the coordinate values (X, Y) of the positional deviation of the hole 29 in advance and enabling the attitudinal deviation of the target hanger 5 to be corrected thereafter.

The hole deviation detector CL4 includes the camera 23 that photographs the hole 29 of the stabilizer 21 at the hole measuring location 27 that is set in the path along which the stabilizer 21 is transferred to output an image data and the computer 25 that calculates the coordinate values (X, Y) of the positional deviation of the hole 29 according to the photographed hole 29. The positional deviation is based on the master hole position Mh that is the reference hole position at the hole measuring location 27 that corresponds to the reference hole position at the hanging location 13.

Accordingly, the coordinate values (X, Y) of the positional deviation of the hole 29 with respect to the master hole position Mh are easily and correctly detected according to the image data of the hole 29.

The attitude deviation detector CL5 detects the attitude of the target hanger 5 at the attitude detecting location 15 set in front of the hanging location 13.

Accordingly, corrections on the held stabilizer 21 are accurately carried out according to the coordinate values (X, Y) of the positional deviation of the hole 29 of the stabilizer 21 and the coordinate value (Y) of the attitudinal deviation of the target hanger 5.

The attitude deviation detector CL5 includes the detecting location sensor 35 arranged in the intermediate area corresponding to the intermediate part of the target hanger 5 in the suspending direction and the deviation sensor 37 arranged in the lower area corresponding to the lower part of the target hanger 5 in the suspending direction. When the detecting location sensor 35 senses the hanger 5, the deviation sensor 37 detects the coordinate value (Y) of the attitudinal deviation of the hook 33 of the target hanger 5 at the lower part thereof with respect the master position Mp defining a hook of a reference hanger at a lower part thereof that involves.

Accordingly, the attitudinal deviation of the hook 33 of the hanger 5 is smoothly detected as the deviation of the lower part of the hanger 5.

The work hanging apparatus 1 includes the guide unit 11 that maintains the attitude of the target hanger 5 without change from the attitude detecting location 15 up to the hanging location 13.

The guide unit 11 is capable of correctly keeping the attitudinal deviation coordinate value (Y) detected at the attitude detecting location 15 up to the hanging location 13.

From the attitude detecting location 15 to the hanging location 13, the guide unit 11 holds the target hanger 5 and guides the same in synchronization with the hanger line CL1.

By holding the target hanger 5 and by moving the same in synchronization with the hanger line CL1, the guide unit 11 correctly conveys the target hanger 5 in the same attitude from the attitude detecting location 15 up to the hanging location 13, thereby allowing the movement of the stabilizer 21 or the hand 17 to be accurately corrected according to the coordinate value (Y) of the attitudinal deviation.

The guide unit 11 has the guide plate 55 and the guide belt 57 that is moved along the guide plate 55 in synchronization with the hanger line CL1. The guide belt 57 has the recesses 57b successively formed in the face 57a of the guide belt 57 that faces the guide plate 55, to receive the target hanger 5 in one of the recesses 57b and hold the same between the guide plate 55 and the guide belt 57.

The guide unit 11 surely holds the target hanger 5 and guides the same while maintaining the attitude of the same without change, so that the hole 29 of the stabilizer 21 correctly catches the hook 33 of the target hanger 5.

It is possible to first detect the attitudinal deviation of the target hanger 5, and thereafter, detect the positional deviation of the hole 29 of the stabilizer 21.

The work hanging method transfers the stabilizer 21 having the hole 29 to the hanging location 13 set in the hanger line CL1 that continuously conveys the hangers 5 each having the hook 33, and at the hanging location 13, catches the hook 33 of a given one of the hangers 5 as the target hanger 5 with the hole 33 of the stabilizer 21. The work hanging method includes: detecting a positional deviation of the hole 29 of the stabilizer 21 with respect to the reference hole position before hanging the stabilizer 21 on the target hanger 5; detecting an attitudinal deviation of the target hanger 5 with respect to the reference hanger attitude defining a hook of a reference hanger to be allowed to be caught with a hole of a reference stabilizer in the reference hole position at the hanging location 13 before the hanging the stabilizer 21 on the target hanger 5, and correcting a movement of the stabilizer 21 according to the detected positional deviation and attitudinal deviation so that the hole 29 of the stabilizer 21 correctly catches the hook 33 of the target hanger 5 at the hanging location 13.

According to the work hanging method, the positional deviation (coordinate values X, Y) of the hole 29 of the stabilizer 21 is detected in advance at the hole measuring location 27 that is set in the path along which the stabilizer 21 is transferred to the hanging location 13.

According to the work hanging method, the stabilizer 21 is preliminarily transferred to the intermediate location set in front of the hanging location 13 while the movement of the stabilizer 21 is corrected according to the coordinate values (X, Y) of the positional deviation of the hole 29.

According to the work hanging method, the attitudinal deviation (coordinate value Y) of the hanger 5 is detected at the attitude detecting location 5 that is set in front of the hanging location 13.

The attitude deviation detector CL5 may employ a camera to pick up an image of the hanger 5, and according to the image, detect the attitudinal deviation of the target hanger 5.

The controller CL3 and corrector CL6 may be realized as functions of the computer 25.

The work handled according to the present invention is not limited to the stabilizer 21. The present invention is applicable to any work having a hole that must correctly catch a hook of a hanger.

According to the embodiments mentioned above, the controller CL3 controls the hand 17 to transfer the held stabilizer 21 to the intermediate location while the corrector CL6 corrects the movement of the hand 17 or the stabilizer 21 according to the coordinate values (X, Y) of the positional deviation of the hole 29 detected with respect to the master hole position WE Instead, no correction may be made on the movement of the stabilizer 21 up to the intermediate location, and at the intermediate location, correction may be made on the movement of the stabilizer 21 according to the positional deviation of the hole 29 as well as the attitudinal deviation detected on the hanger 5. In this case, the stabilizer 21 may be transferred from the intermediate location to the hanging location 13 based on the corrected movement of the stabilizer 21.

What is claimed is:

1. A work hanging apparatus comprising:
a hanger line that continuously conveys a plurality of hangers each having a hook;
a robot that has a movable hand with which a work having a hole is held and transfers the held work to a hanging location set in the hanger line;
a controller that controls a movement of the hand to catch the hook of a given one of the hangers as a target hanger with the hole of the work at the hanging location for hanging the work on the target hanger;
a hole deviation detector that detects a positional deviation of the hole of the work with respect to a reference hole position only at a hole measuring location that is short of the hanging location and is set in a path along which the work that is held by the hand of the robot is transferred to the hanging location while the work is held by the hand of the robot;
an attitude deviation detector that detects, only at an attitude detecting location that is short of the hanging location in the hanger line, an attitudinal deviation of the target hanger with respect to a reference hanger attitude defining a hook of a reference hanger to be allowed to be caught with a hole of a reference work in the reference hole position at the hanging location; and
a corrector that corrects the movement of the hand controlled by the controller according to the detected positional deviation of said work that is held by the hand of the robot at the hole measuring location and the detected attitudinal deviation of said target hanger at the attitude detecting location so that the hole of the work that is held by the hand of the robot correctly catches the hook of the target hanger at the hanging location.

2. The work hanging apparatus of claim 1, wherein the controller controls the movement of the hand to preliminarily transfer the work that is held by the hand of the robot to an intermediate location that is set in front of the hanging location while the corrector corrects the movement of the hand controlled by the controller according to the detected positional deviation.

3. The work hanging apparatus of claim 1, wherein the hole deviation detector includes an image taking unit that takes an image of the hole of the work at the hole measuring location to output image data, and an operation unit that calculates a positional deviation of the hole of the work according to the image data with reference to a reference hole position at the hole measuring location corresponding to the reference hole position at the hanging location.

4. The work hanging apparatus of claim 1, wherein the connector corrects the movement of the hand of the robot according to the positional deviation of the hole during a transfer of the work that is held by the hand of the robot to an intermediate location that is set in front of the hanging location and then corrects the movement of the hand of the robot according to the attitudinal deviation of the target hanger during a transfer of the work that is held by the hand of the robot from the intermediate location to the hanging location.

5. The work hanging apparatus of claim 1, wherein each hanger is suspended from the hanger line, the attitude deviation detector includes a detecting location arranged in an intermediate area corresponding to an intermediate part in a suspending direction of the target hanger and a deviation sensor arranged in an lower area corresponding to a lower part in the suspending direction of the target hanger, and when the detecting location sensor senses the target hanger, the deviation sensor detects an attitudinal deviation of the hook of the target hanger at the lower part thereof with respect to a master hanger position defining a hook of a reference hanger at a lower part thereof that involves no attitudinal deviation as the attitudinal deviation of the target hanger.

6. The work hanging apparatus of claim 5, further comprising a guide unit that guides the target hanger conveyed from the attitude detecting location to the hanging location while maintaining the attitude of the target hanger without change.

7. The work hanging apparatus of claim 6, wherein the guide unit extends from the attitude detecting location to the hanging location and guides the target hanger from the attitude detecting location to the hanging location in synchronization with the hanger line.

8. The work hanging apparatus of claim 7, wherein:
the guide unit includes a guide plate and a guide belt that is moved along the guide plate, the guide belt has recesses successively formed in a face of the guide belt that faces the guide plate and receives the target hanger in one of the recesses to hold the target hanger between the guide belt and the guide plate for guiding the target hanger conveyed from the attitude detecting location to the hanging location.

9. A work hanging method of holding a work having a hole that is held by a hand of a robot and transferring the work that is held by the hand of the robot with a movement of the hand of the robot to a hanging location set in a hanger line that continuously conveys a plurality of hangers each having a hook, and at the hanging location, catching the hook of a given one of the hangers as a target hanger with the hole of the work, the method comprising:
detecting a positional deviation of the hole of the work with respect to a reference hole position only at a hole location that is short of the hanging location and is set in a path along which the work that is held by the hand of the robot is transferred to the hanging location while the work is held by the hand of the robot;

detecting, only at an attitude detecting location that is short of the hanging location in the hanger line, an attitudinal deviation of the target hanger with respect to a reference hanger attitude defining a hook of a reference hanger to be allowed to be caught with a hole of a reference work in the reference hole position at the hanging location; and correcting a movement of the work according to the detected positional deviation of said work that is held by the hand of the robot at the hole measuring location and the detected attitudinal deviation of said target hanger at the attitude detecting location so that the hole of the work that is held by the hand of the robot correctly catches the hook of the target hanger at the hanging location.

10. The method of claim 9, wherein the work is preliminarily transferred to an intermediate location that is set in front of the hanging location while the movement of the work is corrected according to the detected positional deviation.

11. The method of claim 9, wherein the correcting a movement of the work comprises correcting the movement of the hand of the robot according to the positional deviation of the hole during a transfer of the work that is held by the hand of the robot to an intermediate location that is set in front of the hanging location and then correcting the movement of the hand of the robot according to the attitudinal deviation of the target hanger during a transfer of the work that is held by the hand of the robot from the intermediate location to the hanging location.

12. A work hanging apparatus comprising:
a hanger line that continuously conveys a plurality of hangers each having a hook;
a robot that has a movable hand with which a work having a hole is held and transfers the held work to a hanging location set in the hanger line;
a controller that controls a movement of the hand to catch the hook of a given one of the hangers as a target hanger with the hole of the work at the hanging location for hanging the work on the target hanger;
a hole deviation detector that detects a positional deviation of the hole of the work with respect to a reference hole position before hanging the work on the target hanger;
an attitude deviation detector that detects an attitudinal deviation of the target hanger with respect to a reference hanger attitude defining a hook of a reference hanger to be allowed to be caught with a hole of a reference work in the reference hole position at the hanging location before hanging the work on the target hanger, the attitude deviation of the target hanger being detected at an attitude detecting location that is set in front of the hanging location;
a corrector that corrects the movement of the hand controlled by the controller according to the detected positional deviation and attitudinal deviation so that the hole of the held work correctly catches the hook of the target hanger at the hanging location; and
a guide unit that guides the target hanger conveyed from the attitude detecting location to the hanging location while maintaining the attitude of the target hanger without change, the guide unit extending from the attitude detecting location to the hanging location and guiding the target hanger from the attitude detecting location to the hanging location in synchronization with the hanger line, in which
each hanger is suspended from the hanger line, the attitude deviation detector includes a detecting location arranged in an intermediate area corresponding to an intermediate part in a suspending direction of the target hanger and a deviation sensor arranged in an lower area corresponding to a lower part in the suspending direction of the target hanger, and when the detecting location sensor senses the target hanger, the deviation sensor detects an attitudinal deviation of the hook of the target hanger at the lower part thereof with respect to a master hanger position defining a hook of a reference hanger at a lower part thereof that involves no attitudinal deviation as the attitudinal deviation of the target hanger.

13. A work hanging apparatus comprising:
a hanger line that continuously conveys a plurality of hangers each having a hook, each hanger being suspended from the hanger line;
a robot that has a movable hand with which a work having a hole is held and transfers the held work to a hanging location set in the hanger line;
a controller that controls a movement of the hand to catch the hook of a given one of the hangers as a target hanger with the hole of the work at the hanging location for hanging the work on the target hanger;
a hole deviation detector that detects a positional deviation of the hole of the work with respect to a reference hole position before hanging the work on the target hanger;
an attitudinal deviation detector that detects at an attitude detecting location that is set in front of the hanging location an attitudinal deviation of the target hanger with respect to a reference hanger attitude defining a hook of a reference hanger to be allowed to be caught with a hole of a reference work in the reference hole position at the hanging location before hanging the work on the target hanger;
a corrector that corrects the movement of the hand controlled by the controller according to the detected positional deviation and attitudinal deviation so that the hole of the held work correctly catches the hook of the target hanger at the hanging location; and
a guide unit that guides the target hanger conveyed from the attitude detecting location to the hanging location while maintaining the attitude of the target hanger without change, the guide unit extending from the attitude detecting location to the hanging location and guiding the target hanger from the attitude detecting location to the hanging location in synchronization with the hanger line.

* * * * *